United States Patent [19]

Rittersdorf

[11] Patent Number: 4,951,896

[45] Date of Patent: Aug. 28, 1990

[54] SEAT BELT RETRACTOR

[75] Inventor: Udo Rittersdorf, Boenningstedt, Fed. Rep. of Germany

[73] Assignee: General Engineering (Netherlands) B.V., Utrecht, Netherlands

[21] Appl. No.: 284,022

[22] Filed: Dec. 14, 1988

[30] Foreign Application Priority Data

Dec. 15, 1987 [GB] United Kingdom ............. 8729213

[51] Int. Cl.$^5$ .......................................... B60R 22/44
[52] U.S. Cl. ............................................... 242/107
[58] Field of Search .................. 242/107, 107.4 R; 280/806, 807, 808; 297/475–480

[56] References Cited

U.S. PATENT DOCUMENTS

| | | | |
|---|---|---|---|
| 3,984,063 | 10/1976 | Knieriemen | 242/107 |
| 4,113,200 | 9/1978 | Tanaka | 242/107 |
| 4,123,013 | 10/1978 | Bottrill et al. | 242/107 |
| 4,215,830 | 8/1980 | Cunningham | 242/107 |
| 4,564,153 | 1/1986 | Morinaga et al. | 242/107 |
| 4,630,841 | 12/1986 | Nishimura et al. | 242/107 X |
| 4,711,408 | 12/1987 | Mori | 242/107 |
| 4,809,925 | 3/1989 | Takada | 242/107 |

FOREIGN PATENT DOCUMENTS

| | | |
|---|---|---|
| 2736998 | 3/1979 | Fed. Rep. of Germany . |
| 2478471 | 9/1981 | France . |
| 2195232 | 4/1988 | United Kingdom . |

Primary Examiner—John M. Jillions
Attorney, Agent, or Firm—Spencer & Frank

[57] ABSTRACT

A seat belt retractor comprises a spool or shaft onto which a seat belt may be retracted. A first relatively weak spring is provided which tends to wind the belt onto the spool or reel. A second stronger spring is also provided which tends to wind the belt onto the reel but the second spring is only activated selectively, for example when the buckle is released. Thus the strong spring does not, in normal circumstances, pull the belt tightly across the chest of a person wearing it.

5 Claims, 2 Drawing Sheets

SEAT BELT RETRACTOR

BACKGROUND OF THE INVENTION

1. Field of the Invention

The present invention relates to a seat belt retractor.

2. Background Art

It is conventional to provide a seat belt retractor comprising a shaft or spool on which the seat belt may be wound, and a spring adapted to rotate the shaft or spool to withdraw or wind the seat belt onto the spool whenever the seat belt is not in use. Conventionally the spring is relatively strong to ensure that the seat belt is retracted fully, when not in use. The spring must exert a sufficient force to wind the belt fully onto the spool. However, as the belt is withdrawn from the spool, the spring is compressed and exerts a greater force. Thus this prior art arrangement has the disadvantage that whenever a person is wearing the seat belt, the spring is imparting a significant retracting force onto the belt, making the belt sometimes uncomfortably tight across the chest of the person wearing the belt.

BRIEF SUMMARY OF THE INVENTION

According to this invention there is provided a retractor reel for a seat belt, the retractor reel comprising a shaft or spool on which a safety belt may be retracted, a first resilient means for imparting a rotational bias to the shaft or spool tending to retract the belt, and a second resilient means also adapted to provide a rotational bias to the shaft to retract the belt, there being selectively operable means to render the second resilient means inoperative so that, when the selectively operable means are actuated, the shaft or spool is only biased by the first relatively weak resilient means.

Preferably the first resilient means is permanently operational.

Conveniently each resilient means comprises a helical spring.

Advantageously the second spring has one end thereof connected to an element which is fixed in position, and the other end thereof connected to a member which is rotatably mounted in position, the selectively operable means being adapted to connect and disconnect the rotatable member to an arrangement which is adapted to co-rotate with the shaft.

In one embodiment the rotatable member is associated with further selectively operable locking means adapted to lock the rotatable member against rotation.

Preferably the arrangement adapted to co-rotate with the shaft comprises an element selectively slidable axially of the shaft, the element carrying a locking member adapted to engage with projections or teeth formed on the rotatable member so that the rotatable member may effectively be connected to co-rotate with the shaft, or disconnected, the slidable element and the locking member comprising said selectively operable means.

Conveniently the rotatable member carries at least one locking member adapted to engage a fixed abutment or abutments in order to prevent rotation of the rotatable member, the locking member being adapted to be disengaged from said abutment or abutments when the locking member carried by said arrangement co-rotatable with the shaft engages the teeth or abutments on the rotatable member.

Advantageously the element co-rotatable with the shaft is movable axially of the shaft, and is thus moved by a solenoid.

The retractor reel assembly may be in combination with a seat belt buckle containing a switch adapted to adopt one pre-determined condition when a tongue of a safety belt is inserted in the buckle and another condition when the tongue is released from the buckle, said switch controlling the solenoid.

DESCRIPTION OF PREFERRED EMBODIMENTS

Figure 1:
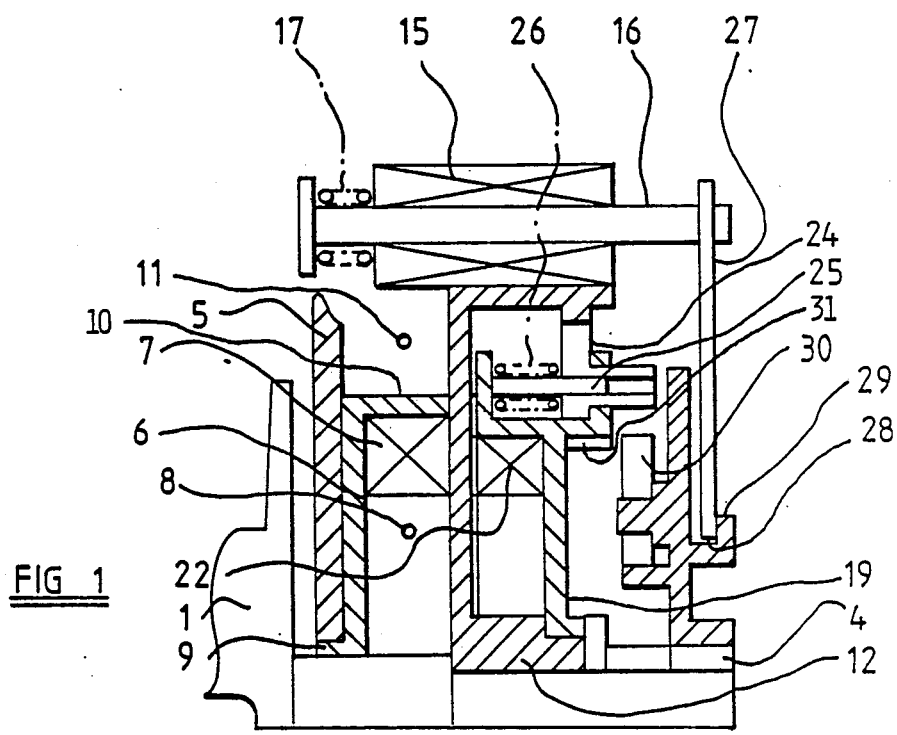
FIG. 1 is a sectional view of an apparatus in accordance with the invention in a first condition.
Figure 2:
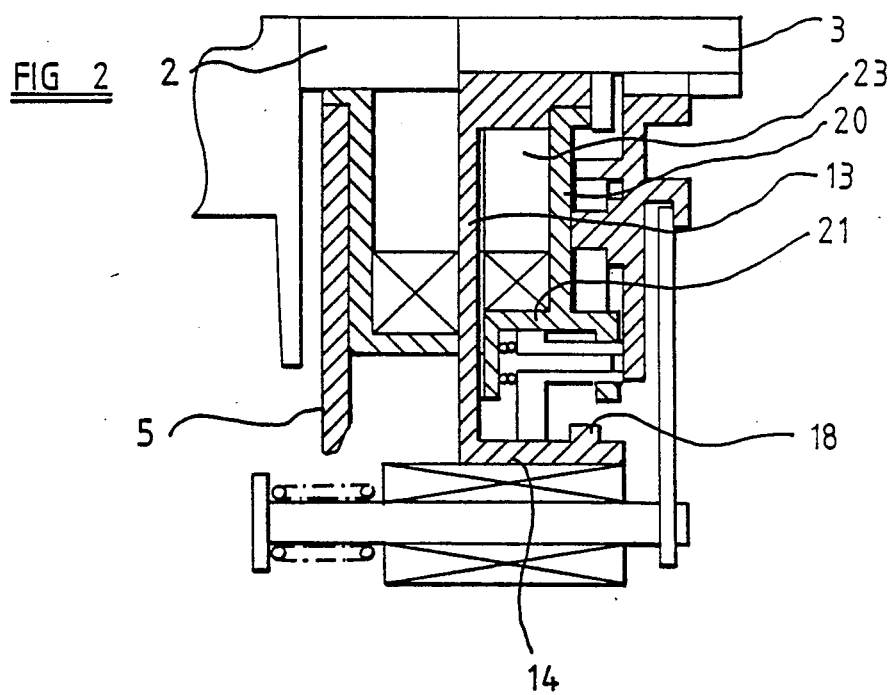
FIG. 2 is a corresponding sectional view showing the apparatus in an alternative condition.

Referring to FIGS. 1 and 2 the drawings, part of a spool 1 on which a seat belt may be retracted is illustrated, the spool being mounted on an axially extending shaft 2 which has a terminal portion 3 of lesser diameter than the initial portion, that terminal portion itself terminating with a part defining a keyway 4. The keyway may be defined by a groove or the like extending axially of the shaft.

The shaft 2 passes through an aperture formed in a vertical metal plate 5 which forms part of a housing on which the spool 1 is mounted. The entire spool is rotatable.

A spring housing 6 for a first spring 7 is provided adjacent the plate 5. The spring housing 6 is fixed in position and defines an annular cavity 8 in which the helical spring 7 is contained.

The spring housing 6 is mounted in a stationary position and the spring housing 6 has a lip 9 which passes through the aperture formed in the metal plate 5 through which the shaft 2 passes, this lip forming a bearing for the shaft 2. The spring housing 6 and the associated lip 9 may be integrally moulded from a plastics material, and thus the spring housing 6 may consist of the lip 9, a radially extending planar portion and a further axially extending cylindrical portion 10. One end of the spring 7 is connected to the shaft 2. The other end of the spring 7 is connected to a radially outermost part of the spring housing 6, that is to say the cylindrical portion 10. The spring 7 has a relatively low spring strength or force, but serves to bias the shaft 2 to rotate in such a sense that a seat belt will be wound onto the spool 1.

The free edge of the cylindrical portion 10 may, when the spring 7 has been mounted in position, be joined to a second spring housing 11, which is also fixedly mounted in position.

The second spring housing 11 consists of a central tubular boss 12 which is mounted on the reduced diameter portion 3 of the shaft of the spool. A radially outwardly extending planar portion 13 extends from the end of this boss 12 closest to the spool 2, this portion 13 forming one wall of the annular cavity 8 which contains the first spring 7. The planar wall 13 has a greater radial extent than the radial extent of the first spring housing 6, and terminates in a cylindrical portion 14 which extends away from the spool 1. The cylindrical portion 14, carries on its exterior, a solenoid comprising an electromagnet 15 having a plunger 16 biased to a predetermined initial position by means of a spring 17.

The cylindrical portion 14 carries, on its interior, a circular array of radially inwardly directed teeth 18.

Rotatably mounted on the boss 12 is a carrier 19, the carrier comprising a lip rotatably received in a corresponding recess formed in the boss 12, a planar radially outwardly directed portion 20, of a lesser radial extent than the second spring housing 11, terminating in a cylindrical portion 21 which extends towards the planar portion 13 of the second spring housing 11. A second helical spring 22 is contained within the annular cavity 23 defined between the boss 12 and the cylindrical portion 21, one end of the spring being connected to the interior of the cylindrical portion 21 and the other end of the spring being connected to the boss 12. This second spring 22 may be a stronger spring than the first spring 7.

The cylindrical portion 21 carries a bracket which supports a locking element 24 which is mounted for axial movement on a pin 25 in a direction parallel to the axis of the shaft 2, and which is biased to one terminal position by means of a spring 26. When the locking member 24 is in the terminal position, a projection on the locking member engages between two of the teeth 18 formed on the cylindrical portion 14, and thus the carrier 19 is prevented from rotating relative to the second spring housing 11.

The plunger 16 of the electromagnet 15 is connected to an actuating fork or plate 27 which engages with a slider 28. The slider 28 is of disc-like configuration, having a central aperture which is engaged on the end of the shaft 3. Part of the aperture extends into a keyway 4 so that the disc of the slider co-rotates with the shaft 3. The fork 27 engages with an annular groove 29 formed in the disc 28. The arrangement is such stet operation of the electromagnet moves the slider axially along the shaft 3. The disc 28 is of such a radial extent that a peripheral part of the disc is aligned with the end of the locking member 24 so that when the disc moves axially the locking member 24 is moved axially, thus compressing the spring 26 and disengaging the locking member from the teeth 18.

The disc 28, however, also carries at least one further locking member 30 which is so located as to engage with two teeth of a circular array of teeth 31 carried by the carrier 19, when the disc 28 is moved axially.

Figure 3:
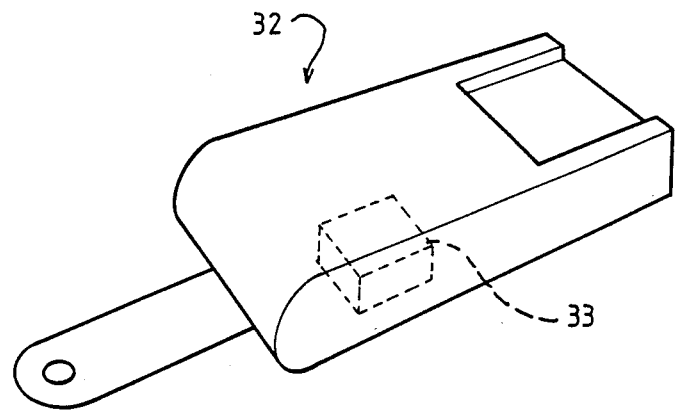
FIG. 3 is a view of a buckle for use with the retractor apparatus.

The described retractor is intended to be utilised in conjunction with a seat belt having a buckle 32 as shown in FIG. 3 which incorporates an electric switch 33, the switch being moved to a predetermined condition whenever a tongue carried by the seat belt is inserted into the buckle, the switch reverting to another predetermined condition whenever the tongue is released from the buckle. The switch is adapted to control the described electromagnet 15, the arrangement being such that the plunger of the electromagnet 15 is fully extended whenever the tongue is inserted into the buckle, and is retracted whenever the tongue is not present in the buckle.

FIG. 1 illustrates the condition of the described retractor reel assembly when the tongue is inserted in the buckle and FIG. 2 illustrates the condition when the tongue is not inserted in the buckle.

Starting initially from the condition illustrated in FIG. 2, it can be seen that the locking member 30 engages with the teeth 31, so that the carrier 19 is forced to rotate with the shaft 2, because the slider disc 28 is co-rotating with the shaft, and this disc is selectively engaged with the carrier 19. The spring 22, thus imparts a torsional force to the shaft tending to wind a seat belt onto the spool 1. The reason for this is that the boss 12 is fixed in position and one end of the spring 22 is connected to the boss 12. The other end of the spring is connected to the cylindrical portion 21 of the carrier 19, thus imparting a rotary bias to that carrier 19 which is transmitted, via the locking member 30 and the disc 28 and the keyway 4 to the shaft 3 and thus to the spool 1. Simultaneously, of course, spring 7 is also imparting a spring bias to the shaft 2 tending to wind a seat belt onto the spool 1. Thus the shaft receives a bias from both springs, and thus there is a sufficient force to wind the seat belt fully onto the spool.

If a person then puts on the seat belt, the person will protract the seat belt against the bias of the two springs 7 and 22, causing the spool 1 to rotate and thus also causing the shaft portions 2 and 3 to rotate. Both springs will be placed under a slightly increasing tension as increasing lengths of belt are paid out.

However, when the person wearing the belt inserts the tongue of the belt into the buckle, the condition of the electromagnet 15 changes. The disc 28 is thus moved axially away from the spool 1, towards the condition illustrated in FIG. 1. Initially the locking member 24 will engage with the teeth 18, thus preventing rotation of the carrier 19. Subsequently the locking member 30 will dis-engage from the teeth 31, thus enabling the shaft 3 to rotate. It will be understood, that by this expedient, the tension stored in the spring 22 will remain stored in that spring, but the tension stored in the spring 22 will not be imparted to the spool 1, since the mechanical connection between the spring 22 and the spool 1 has now been selectively broken. However, the spring 7 is still imparting a bias to the shaft 2. Thus a person wearing the seat belt can move relatively freely, and is not subjected to a significant force across his or her chest, since only one spring is imparting a bias to the shaft 2.

When the person wearing the seat belt wishes to leave the motor vehicle, the person will initially release the buckle, so that the tongue becomes extracted from the buckle, and the condition of the electromagnet will then revert to the initially described condition. The disc 28 will move so that the locking member 30 engages the teeth 31 and also so that the locking member 24 disengages the teeth 18, and, as has been described above, when the apparatus is in this condition both the first spring 7 and the second spring 22 impart a bias to the shaft 2 and thus to the spool 1. Thus the seat belt will then be withdrawn by the significant bias of the combined springs.

It may be found preferable for the second spring 22 to be significantly stronger than the first spring 7.

What is claimed is:

1. A retractor reel for a seat belt, comprising:
    a fixed element;
    a shaft means on which a safety belt may be retracted, said shaft means being rotatable relative to said fixed element;
    a rotatable member rotatable relative to said shaft means and having engaging projections;
    a first continuously operational resilient means for imparting a rotational bias to said shaft means and tending to retract the belt;

a second resilient means having one end thereof connected to said fixed element and the other end thereof connected to said rotatable member;

a shifting arrangement co-rotatable with said shaft means, said arrangement including a slidable element selectively slidable axially of said shaft means between two terminal positions, said axially slidable element carrying a locking member means for, in one terminal position of said slidable element, engaging with said projections on said rotatable member for effectively connecting said rotatable member to co-rotate with said shaft means; and selectively operable means for connecting and disconnecting said rotatable member to said shifting arrangement for causing said second resilient means to provide, selectively, a rotational bias to said shaft means for retracting the belt.

2. A retractor reel according to claim 1, further comprising at least one fixed abutment on said fixed element, and wherein said rotatable member has at least one locking member for engaging said at least one fixed abutment for preventing rotation of said rotatable member when said slidable element is in the other of said two terminal positions, said at least one locking member disengaging from said at least one abutment when said slidable element is in said one terminal position.

3. A retractor reel according to claim 2, wherein the rotable member is movable axially between an engaged position and a disengaged position, relative to said at least one fixed abutment, in response to movement of said axially slidable element, and further including spring biasing means for biasing said at least one locking member carried by the rotatable member into one of said positions.

4. A retractor reel according to claim 1, including a solenoid connected to move said axially slidable element.

5. A retractor reel according to claim 4, in combination with a seat belt buckle adapted to receive a tongue of a safety belt and including switch means connected for controlling said solenoid, said switch means having one predetermined state when a tongue of a safety belt is inserted in said buckle and another predetermined state when a tongue of a safety belt is released from said buckle.

* * * * *